(12) United States Patent
Nakazawa et al.

(10) Patent No.: US 7,489,304 B2
(45) Date of Patent: Feb. 10, 2009

(54) TOUCH PANEL DEVICE

(75) Inventors: Fumihiko Nakazawa, Kawasaki (JP);
Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 10/642,640

(22) Filed: Aug. 19, 2003

(65) Prior Publication Data

US 2004/0032401 A1    Feb. 19, 2004

(30) Foreign Application Priority Data

Aug. 19, 2002   (JP) ............................. 2002-238519

(51) Int. Cl.
*G09G 3/41* (2006.01)
(52) U.S. Cl. ..................................... 345/173
(58) Field of Classification Search ......... 345/173–177; 362/31; 349/12, 56, 84, 162; 178/18.01, 178/18.03, 18.04
See application file for complete search history.

(56) References Cited

U.S. PATENT DOCUMENTS

| 6,456,279 | B1 * | 9/2002 | Kubo et al. | 345/173 |
|---|---|---|---|---|
| 6,892,009 | B2 * | 5/2005 | Ito et al. | 385/49 |
| 6,937,230 | B2 * | 8/2005 | Hatakeda et al. | 345/173 |
| 7,034,808 | B2 * | 4/2006 | Sakata et al. | 345/173 |
| 2001/0019479 | A1 * | 9/2001 | Nakabayashi et al. | 362/31 |
| 2002/0092746 | A1 * | 7/2002 | Kawashima et al. | 200/310 |
| 2002/0145593 | A1 * | 10/2002 | Boyd et al. | 345/173 |
| 2002/0154250 | A1 * | 10/2002 | An | 349/12 |
| 2002/0172031 | A1 * | 11/2002 | Masuda | 362/31 |
| 2003/0011720 | A1 * | 1/2003 | Kawashima et al. | 349/12 |
| 2004/0080483 | A1 * | 4/2004 | Chosa | 345/104 |

FOREIGN PATENT DOCUMENTS

| CN | 2289258 Y | 8/1998 |
|---|---|---|
| CN | 1361471 A | 7/2002 |

(Continued)

OTHER PUBLICATIONS

Journal of Gansu Education College (Natural Sciences), vol. 13, No. 1, Apr. 1999.

(Continued)

*Primary Examiner*—Sumati Lefkowitz
*Assistant Examiner*—Rodney Amadiz
(74) *Attorney, Agent, or Firm*—Westerman, Hattori, Daniels & Adrian, LLP.

(57) ABSTRACT

A substrate made of glass serves both as a substrate for a touch panel and as that for a front light, and has both functions of propagating an ultrasonic wave in order to detect a touched position, and propagating light emitted from a light source to guide the light toward a reflective-type liquid crystal display. In the case where an image on the liquid crystal display is made visible by external light, external light which has been transmitted through the substrate is reflected by the liquid crystal display, and the reflected light is again transmitted through the substrate to be emitted from the front face. In the case where the front light function is used, light which has been introduced into the substrate from the light source is reflected by the liquid crystal display, and the reflected light is transmitted through the substrate to be emitted from the front face.

16 Claims, 10 Drawing Sheets

FOREIGN PATENT DOCUMENTS

| | | |
|---|---|---|
| JP | 05-158034 A | 6/1993 |
| JP | 6-123885 A | 5/1994 |
| JP | 6-208113 | 7/1994 |
| JP | 6-235917 | 8/1994 |
| JP | 10-326515 A | 12/1998 |
| JP | 11-344695 A | 12/1999 |
| JP | 2000-89910 A | 3/2000 |
| JP | 2000-162594 | 6/2000 |
| JP | 2001-051256 A | 2/2001 |
| JP | 2001-051272 A | 2/2001 |
| JP | 2001-337623 A | 12/2001 |
| JP | 2002-014623 A | 1/2002 |
| JP | 2002-23158 A | 1/2002 |

OTHER PUBLICATIONS

Opto Electron IC Technology, vol. 21, No. 3, Sep. 2001, pp. 210-215.
Foreign Office Action dated May 27, 2005 with English translation.
An Office Action from the Chinese Patent Office dated Mar. 17, 2006, for corresponding Chinese Patent Application 03154317.0, with an English language translation.
Japanese Office Action 2002-238519 for corresponding foreign application dated Aug. 22, 2006.

* cited by examiner

TOUCH PANEL DEVICE

BACKGROUND OF THE INVENTION

The present invention relates to a touch panel device which detects a position where an article such as a finger or a pen is touched, and more particularly to a touch panel device which integrally comprises a front light that is to be used for a reflective-type liquid crystal display.

As computer systems which are typically personal computers become widespread, touch panel devices are used. In a touch panel device, an area of a screen of liquid crystal display on which data are displayed by a computer system is pointed by an object such as a finger or a pen, thereby inputting new data or giving various kinds of instructions to the computer system.

Liquid crystal displays are roughly classified into transmissive-type ones and reflective-type ones. A transmissive-type liquid crystal display is configured so that an image is made visible by transmitted light from a light source (back light) which is placed in rear of a liquid crystal panel. A touch panel device having a transmissive-type liquid crystal display must use a back light, so that the power consumption is increased by the back light and the driving time by a battery power source is shortened. As a result, such a touch panel device is not suitable for a portable electronic apparatus such as a portable telephone or a PDA (Personal Digital Assistant).

In order to reduce the power consumption, therefore, a reflective-type liquid crystal display which does not require a back light is used. A reflective-type liquid crystal display is configured so that light entering through the front face of a liquid crystal panel is reflected by the back face of the liquid crystal panel and an image is made visible by the reflected light. A touch panel device having a reflective-type liquid crystal display is suitable for a portable electronic apparatus because the nonuse of a back light reduces the power consumption, and also because visibility under external light in an outdoor use is excellent.

Usually, such a touch panel device having a reflective-type liquid crystal display comprises a light source (front light) which illuminates the reflective-type liquid crystal display from the front face of the liquid crystal panel so that the device can be used even in the case where the amount of external light is insufficient, or during the night. Therefore, such a device can use both external light and light emitted from the front light.

FIG. 1 is a section view showing the configuration of a conventional touch panel device using an ultrasonic wave. The touch panel device is configured by a combination of a touch panel 51, a front light 52, and a reflective-type liquid crystal display 53. In the touch panel 51, a plurality of transmitter elements which transmit an ultrasonic wave, and a plurality of receiver elements which receive the ultrasonic wave are formed on a glass plate 51a, the ultrasonic wave is propagated through the glass plate 51a between the transmitter and receiver elements, and attenuation of the ultrasonic wave due to a touch of an object such as a finger or a pen with the glass plate is sensed to detect the position where the object is touched. The front light 52 is placed between the touch panel 51 and the liquid crystal display 53, and has: an elongated light source 52a which emits light; and a planar light guide 52b which converts the light from the light source 52a into planar light and emits the planar light.

FIG. 2 is a diagram showing optical paths in the conventional touch panel device. In the case where an image on the liquid crystal display 53 is made visible by external light, as indicated by the thick solid arrow in FIG. 2, external light which has been transmitted through the touch panel 51 (the glass plate 51a) and the front light 52 (the planar light guide 52b) is reflected by the liquid crystal display 53, and the reflected light is again transmitted through the front light 52 (the planar light guide 52b) and the touch panel 51 (the glass plate 51a) to be emitted from the front face (the upper face in FIG. 2). In the case where the front light 52 is used, as indicated by the thin solid arrow in FIG. 2, light which has been guided into the planar light guide 52b from the light source 52a is reflected by the liquid crystal display 53, and the reflected light is transmitted through the front light 52 (the planar light guide 52b) and the touch panel 51 (the glass plate 51a) to be emitted from the front face (the upper face in FIG. 2).

In these optical paths, there are four optical interfaces (the front face (the upper face in FIG. 2) and the back face (the lower face in FIG. 2) of the glass plate 51a, and the front face (the upper face in FIG. 2) and the back face (the lower face in FIG. 2) of the planar light guide 52b). Therefore, the incident light is reflected in the respective optical interfaces as indicated by the broken lines in FIG. 2. There is a problem that the reflected light indicated by the broken lines becomes noises and the amount of useful light is reduced and visibility is therefore impaired.

The above-mentioned problem occurs similarly in a conventional touch panel device using a resistance film.

Specifically, in the case where anti-reflection treatment (AR treatment) based on surface coating is not applied, the reflectance in each optical interface is about 4%, and, in the case where AR treatment is applied, the reflectance in each optical interface is about 1%. When external light is used, the light passes through the eight optical interfaces, and hence the amount of light is reduced by 28% in the case where AR treatment is not applied, and by 8% even in the case where AR treatment is applied, with the result that the display brightness is lowered. When the front light 52 is used, light passes through the four optical interfaces, and hence the display brightness is reduced by 15% in the case where AR treatment is not applied, and by 4% even in the case where AR treatment is applied.

As described above, a conventional touch panel device in which a touch panel, a front light, and a reflective-type liquid crystal display are combinedly used has a problem in that the display brightness is lowered by reflected light caused in the touch panel and the front light and hence visibility is low.

BRIEF SUMMARY OF THE INVENTION

The present invention has been made with the aim of solving the above problems, and it is a principal object of the present invention to provide a touch panel device comprising an integrally mounted front light, which can suppress lowering of brightness and realize excellent visibility even when a touch panel and the front light are combined together.

A touch panel device according to a first aspect of the present invention comprises: a touch panel for detecting a touched position; and a lighting device including a light source, a light guiding part on which light is incident from the light source, and a light guiding and emitting part for guiding light propagated through the light guiding part so as to emit the light from the surface, wherein the light to be guided to the outside from the light guiding and emitting part is emitted from a side opposite to a side on which the touched position is to be detected.

In the touch panel device of the first aspect, the light incident on the light guiding part from the light source is guided to the outside (a reflective-type liquid crystal display) from a face (light guiding and emitting part) opposite to a touched position detection face of the touch panel device. Therefore, the light surely irradiates the reflective-type liquid crystal display.

According to a touch panel device of a second aspect, the light guiding and emitting part is a step-like structure formed on a face of the light guiding part opposite to the touched position detection side. Therefore, the light surely irradiates the reflective-type liquid crystal display. The formation direction of the step-like structure preferably forms an angle of not more than 32.5° with respect to a normal direction of the face of the light guiding part. Within this range of angle, even when reflected light is emitted to the touched position detection side, it is outside the view range and practically causes no problem.

According to a touch panel device of a third aspect, the light guiding and emitting part is a plurality of protrusions formed on the light guiding part, and an optical refractive index of the protrusions is not less than an optical refractive index of the light guiding part. By providing at the light guiding part portions (protrusions) having an optical refractive index not less than that of the light guiding part, total reflection conditions of the light propagated in the light guiding part are not satisfied, and the light is emitted to the outside from the surface of the light guiding part. Therefore, the light surely irradiates the reflective-type liquid crystal display.

A touch panel device according to a fourth aspect is configured so that the light guiding and emitting part is a plurality of grooves formed in the face of the light guiding part opposite to the touched position detection side. By providing a plurality of grooves in the face of the light guiding part, the light propagated in the light guiding part is reflected by the grooves and emitted to the outside. Therefore, the light surely irradiates the reflective-type liquid crystal display. The formation direction of the grooves preferably forms an angle of 35° to 55° with respect to the normal direction of the face of the light guiding part. Within this range of angle, the light reflected by the grooves is emitted substantially perpendicular to the face of the light guiding part, and therefore the light efficiently irradiates the reflective-type liquid crystal display.

According to a touch panel device of a fifth aspect, the light guiding and emitting part is a plurality of prisms formed on the face of the light guiding part opposite to the touched position detection side. By providing a plurality of prisms on the face of the light guiding part, the light propagated in the light guiding part is emitted to the outside via the prisms. Therefore, the light surely irradiates the reflective-type liquid crystal display.

According to a touch panel device of a sixth aspect, the substrate in which an ultrasonic wave is to be propagated and the light guiding part of the lighting device are bonded together by an adhesive agent. Therefore, reflected light due to optical interfaces is smaller in an amount than that in the conventional art example, so that the lowering of brightness caused by reflected light is also reduced and visibility is improved. Moreover, since a substrate for a touch panel and a substrate (light guiding and emitting part) for a front light are separately produced and then bonded together, the production process is simple.

According to a touch panel device of a seventh aspect, the touch panel and the light guiding part of the lighting device are bonded together by an adhesive agent having a refractive index less than that of the touch panel and the light guiding part. Therefore, propagation of light to the touch panel is prevented.

A touch panel device according to an eighth aspect is a touch panel device in which an ultrasonic wave is propagated through a substrate and a change in a propagation state of the ultrasonic wave due to a touch of an object with the substrate is sensed to detect a position where the object is touched, wherein the substrate is optically transparent, and the device comprises: a light source for emitting light which is to be incident on the substrate; and a light guiding and emitting part for guiding the light incident on the substrate from the light source so as to emit the light to an outside. The single substrate performs both the function of propagating an ultrasonic wave to detect the position where an object is touched and the function of propagating light from the light source and emitting the light to the outside. Namely, the substrate is used as a substrate of a touch panel and also as that of a front light. Therefore, the number of optical interfaces is reduced by half as compared to the conventional art example, so that the lowering of brightness caused by reflected light is also reduced by half and visibility is improved.

The above and further objects and features of the invention will more fully be apparent from the following detailed description with accompanying drawings.

DETAILED DESCRIPTION OF THE INVENTION

Hereinafter, the invention will be described in detail with reference to the drawings showing embodiments of the invention.

First Embodiment

Figure 1:
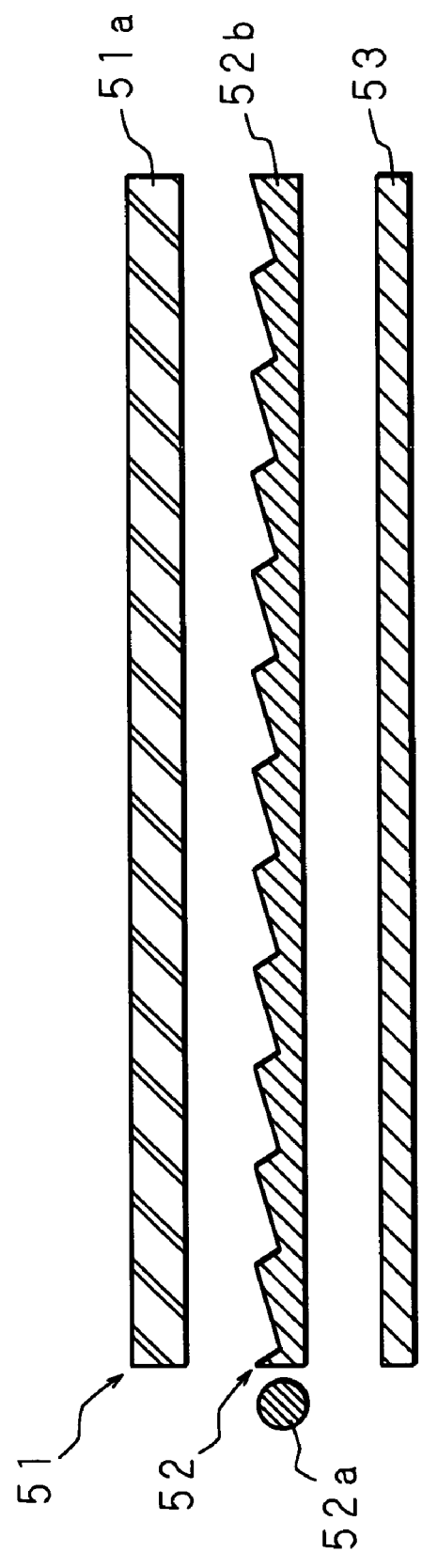
FIG. 1 is a section view showing the configuration of a conventional touch panel device.
Figure 3:
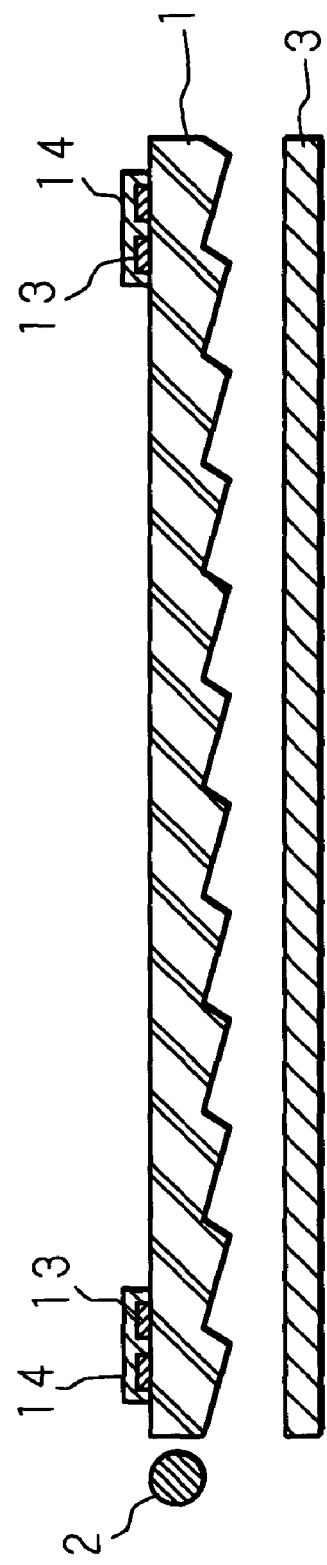
FIG. 3 is a section view showing the configuration of a touch panel device of a first embodiment.
Figure 4:
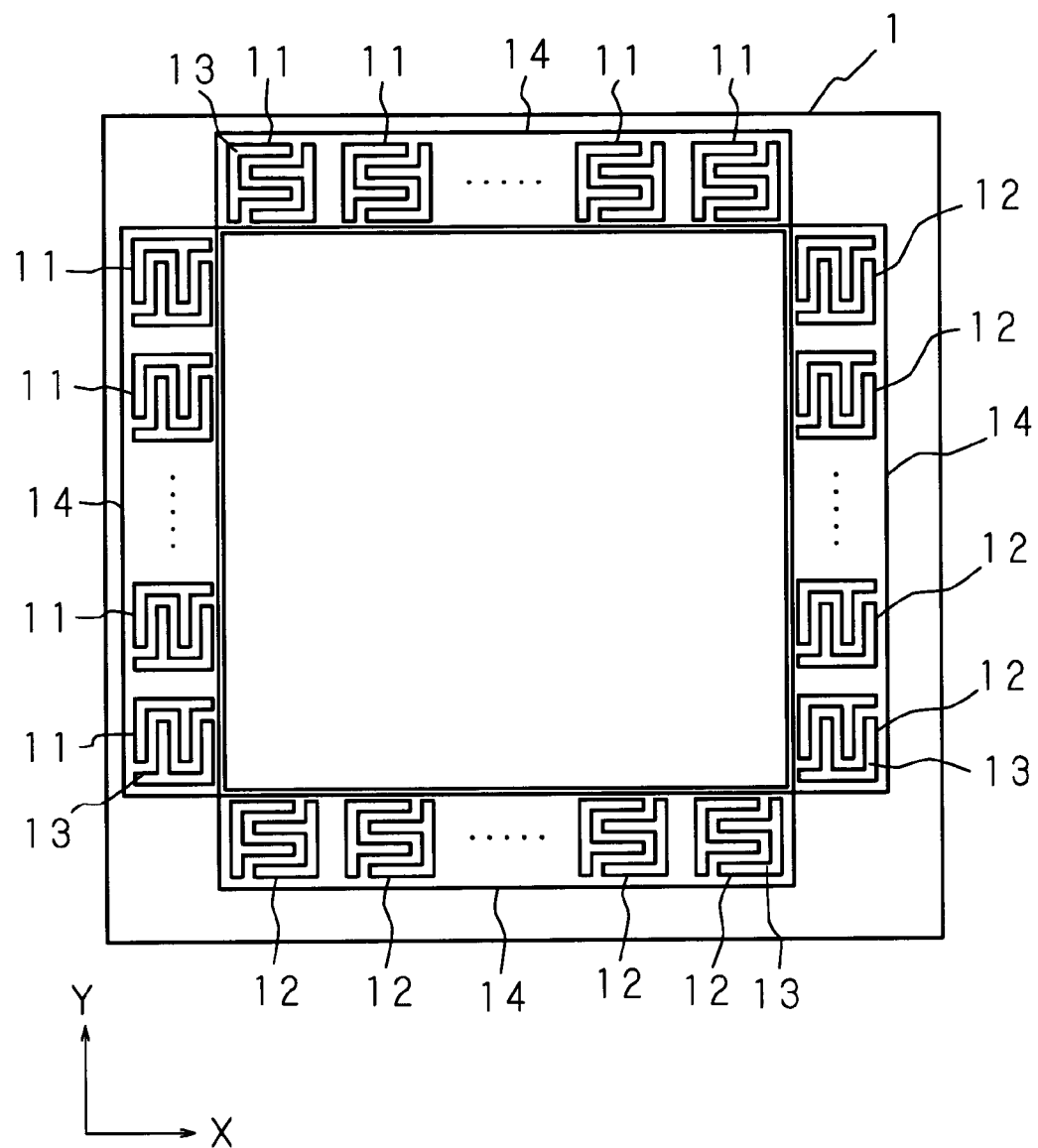
FIG. 4 is a plan view showing the configuration of the touch panel device of the first embodiment.

FIGS. 3 and 4 are section and plan views showing the configuration of a touch panel device using an ultrasonic wave of a first embodiment of the invention, respectively. In FIGS. 3 and 4, 1 denotes a substrate which is made of glass, and which serves as a substrate for a touch panel and also as that for a front light. The substrate 1 has both a function of propagating a surface acoustic wave (SAW) for detecting a touched position, and that of propagating light from a linear light source 2 to emit the light to a reflective-type liquid crystal display 3.

The light source 2 is configured by, for example, a fluorescent lamp having a long columnar shape, and the major axial plane is opposed to one end face of the substrate 1. The light source 2 and the substrate 1 are optically coupled with each other. Diffused light which is emitted from the light source 2 and then is incident to the substrate 1 is propagated through the substrate 1 to reach the surface thereof. Usually, the angle of light which is propagated through the substrate 1 to reach the surface is equal to or larger than the total reflection angle. Therefore, the light is totally reflected and is not emitted to the outside. In the first embodiment, therefore, a step-like structure for realizing a front light function (a function of emitting light propagated through the inside to the liquid crystal display 3 on side of the back face (on the side of the lower face in FIG. 3)) is formed on the face (the face opposed to the liquid crystal display 3) of the substrate 1 which is opposite to the face where the touched position is to be detected. As a result, the light emitted from the light source 2 is incident to the substrate 1 to be propagated through the substrate 1, and is then emitted to the outside on the back face side (on the side of the lower face in FIG. 3) to irradiate the liquid crystal display 3. In this way, the substrate 1 in the invention functions as a planar light guide.

The function of detecting a touched position in the touch panel device of the invention will be described with reference to FIG. 4. A plurality of exciting elements 11 which excite a surface acoustic wave are arranged in a row in one end portion of each of the X- and Y-directions of the substrate 1. A plurality of receiving elements 12 which receive the surface acoustic wave are arranged in a row in the other end portion of each of the X- and Y-directions of the substrate 1 so as to be opposed respectively to the exciting elements 11. Each of the exciting elements 11 and the receiving elements 12 is configured by an inter digital transducer (IDT) 13 which is obtained by patterning a thin film of, for example, aluminum (Al), and a piezoelectric thin film 14 which is laid on the transducer, and which is made of, for example, zinc oxide (ZnO) or aluminum nitride (AlN).

A periodic signal is supplied to each of the exciting elements 11 to excite a surface acoustic wave. The surface acoustic wave is propagated through the substrate 1. The propagated surface acoustic wave is received by the opposed receiving elements 12. When an object (such as a finger or a pen) is touched with a propagation path of the surface acoustic wave on the substrate 1, the surface acoustic wave is attenuated. When the existence of level attenuation of a reception signal of the receiving elements 12 is sensed, therefore, it is possible to detect the touch of the object and the touched position.

Figure 5:
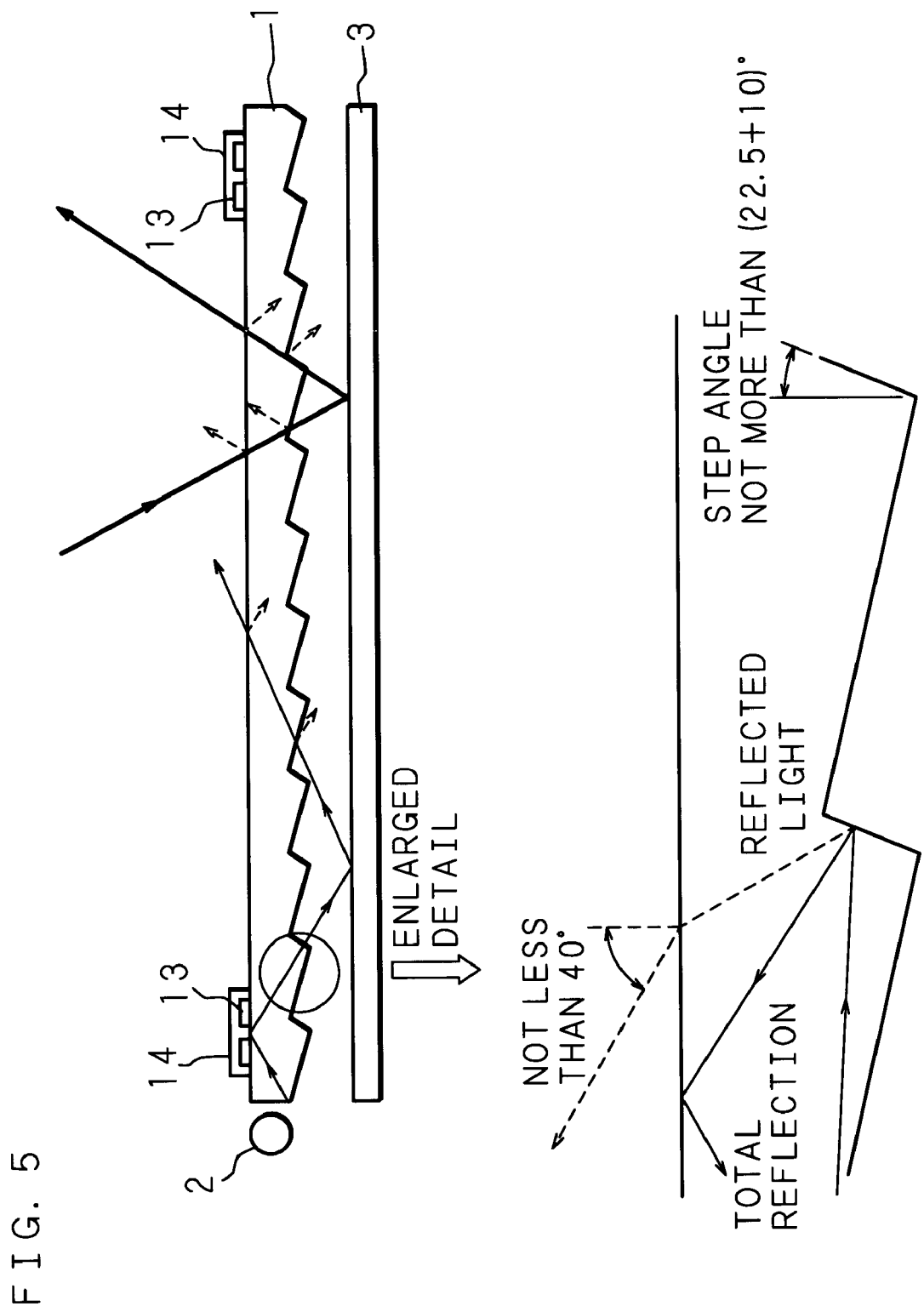
FIG. 5 is a diagram showing optical paths in the touch panel device of the invention.

FIG. 5 is a diagram showing optical paths in the touch panel device of the invention. In the case where an image on the liquid crystal display 3 is made visible by external light, as indicated by the thick solid arrow in FIG. 5, external light which has been transmitted through the substrate 1 is reflected by the liquid crystal display 3, and the reflected light is again transmitted through the substrate 1 to be emitted from the front face (the upper face in FIG. 5). In the case where the front light function is used, as indicated by the thin solid arrow in FIG. 5, light which has been introduced into the substrate 1 from the light source 2 is reflected by the liquid crystal display 3, and the reflected light is transmitted through the substrate 1 to be emitted from the front face (the upper face in FIG. 5).

Figure 2:
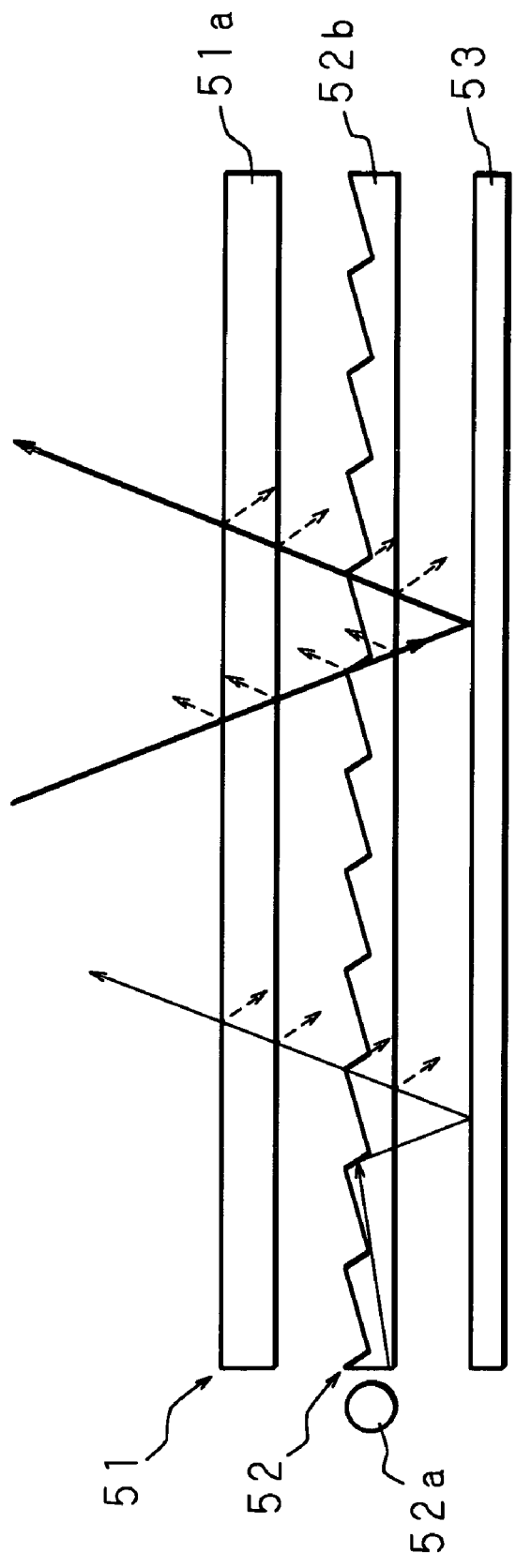
FIG. 2 is a diagram showing optical paths in the conventional touch panel device.

In these optical paths, there are two optical interfaces (the front face (the upper face in FIG. 5) and the back face (the lower face in FIG. 5) of the substrate 1). Therefore, the incident light is reflected in the respective optical interfaces as indicated by the broken lines in FIG. 5. Since there are only two optical interfaces, attenuation of the amount of light caused by reflected light is smaller than that in the conventional art example described above (the four optical interfaces, see FIG. 2). As compared with the conventional art example, specifically, when external light is used, lowering of the display brightness is improved to 15% from 28% in the case where AR treatment is not applied, and to 4% from 8% in the case where AR treatment is applied. When the front light function is used, lowering of the display brightness is improved to 8% from 15% in the case where AR treatment is not applied, and to 2% from 4% in the case where AR treatment is applied. As a result, in the touch panel device of the invention, visibility is greatly improved as compared with the conventional art example.

At the front light, when light is emitted to the touch panel side (the front face side of the substrate 1), the light is observed as noise light and causes a decrease in the contrast of the display screen. Therefore, in the first embodiment using a step-like structure, the angle of a step slope with respect to the normal line of the face of the substrate 1 is set so as to prevent reflected light caused at the step slope from being emitted to the touch panel side (in the direction of the viewer), i.e., cause the light to propagate in the substrate 1 while being totally reflected. An angle of the step slope is about 22.5° or less at which light propagating in the substrate 1 in an almost horizontal direction is reflected at the step slope and the reflected light stays in the substrate. This is an ideal case. In the case where noise light is emitted to the outside of the view range (the angle from the front face is ±40° or more), since there is no practical problem concerning visibility, the angle of the step slope can be (22.5+10)° or less.

Next, embodiments (second to fourth embodiments) in which light propagated through the substrate 1 can be surely guided toward the reflective-type liquid crystal display 3 will be described.

Second Embodiment

Figure 6:
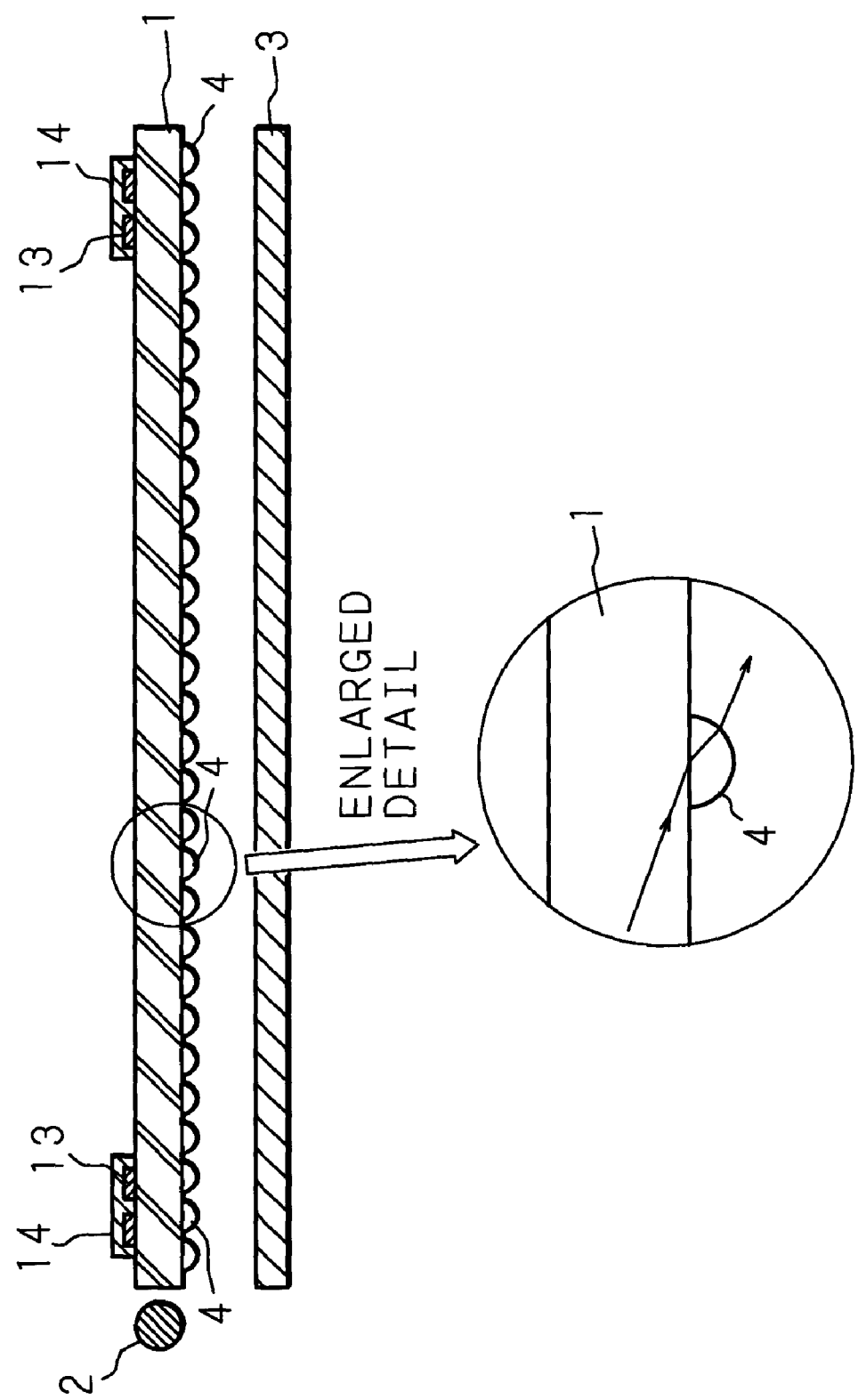
FIG. 6 is a section view showing the configuration of a touch panel device of a second embodiment.

FIG. 6 is a section view showing the configuration of a touch panel device using an ultrasonic wave of the second embodiment of the invention. In FIG. 6, the components identical with those of FIG. 3 are denoted by the same reference numerals. In the second embodiment, a high-optical refractive index portion 4 made of optically transparent resin having an optical refractive index which is nearly equal to that of the substrate 1 made of glass is disposed in each of plural places of the back face (the face which is opposite to the face where the touched position is to be detected, or that which is opposed to the liquid crystal display 3) of the substrate 1. The high-optical refractive index portions 4 can be formed by attaching a resin material of a high optical refractive index to the substrate 1 by a printing method.

In the second embodiment, since the high-optical refractive index portions 4 are disposed, total reflection conditions of the light propagated through the substrate 1 serving as a light guide are dissatisfied, thereby causing the light to be emitted toward the liquid crystal display 3. Specifically, as indicated by the thin solid arrow in the enlarged detail in FIG. 6, the light which reaches at the total reflection angle the back face of the substrate 1 advances to the optically transparent high-optical refractive index portion 4, and is then emitted from the high-optical refractive index portion 4 toward the liquid crystal display 3.

In the case where the high-optical refractive index portions 4 are formed by a constant pitch, the areas of the high-optical refractive index portions 4 are made larger as the portions are remoter from the light source 2, or, in the case where the areas of the high-optical refractive index portions 4 are constant, the formation pitch of the high-optical refractive index portions 4 is made shorter as the portions are remoter from the light source 2, whereby the brightness of the light emitted from the substrate 1 can be uniformalized over the whole back face of the substrate 1.

In the second embodiment also, the substrate serves both as a substrate for a touch panel, and as that for a front light. In the same manner as the first embodiment, therefore, the influence of reflected light in optical interfaces can be reduced and visibility can be improved as compared with the conventional art example.

Third Embodiment

Figure 7:
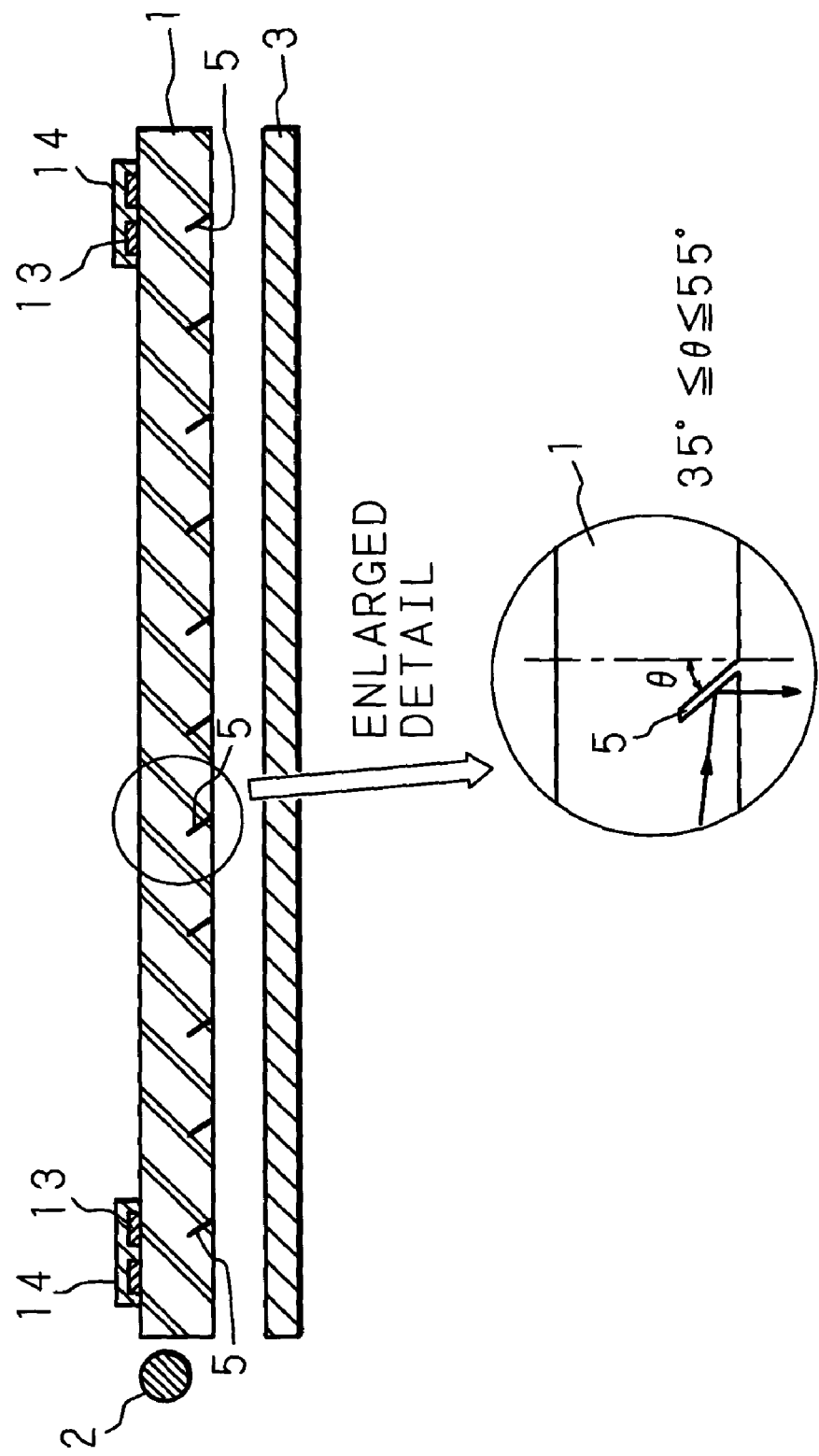
FIG. 7 is a section view showing the configuration of a touch panel device of a third embodiment.

FIG. 7 is a section view showing the configuration of a touch panel device using an ultrasonic wave of the third embodiment of the invention. In FIG. 7, the components identical with those of FIG. 3 are denoted by the same reference numerals. In the third embodiment, minute oblique grooves 5 are disposed by a predetermined pitch in plural places of the back face (the face which is opposite to the face where the touched position is to be detected, or that which is opposed to the liquid crystal display 3) of the substrate 1 made of glass. As shown in the enlarged detail in FIG. 7, the formation direction of the grooves 5 has an angle of 35° to 55° with respect to the normal direction of the back face of the substrate 1. The grooves 5 can be formed by patterning a resist film and then performing a wet etching process, or a dry etching process such as RIE (Reactive Ion Etching) or milling.

In the third embodiment, as indicated by the thin solid arrow in the enlarged detail in FIG. 7, light propagated through the substrate 1 serving as a light guide is reflected by the grooves 5 toward the back face (the lower face in FIG. 7), and the reflected light is guided toward the liquid crystal display 3. Since the formation direction of the grooves 5 is set to have an angle of 35° to 55°, preferably 45° with respect to the normal direction of the back face of the substrate 1, light can be emitted substantially perpendicularly, so that the light can efficiently irradiate the reflective-type liquid crystal display 3.

In the third embodiment also, the substrate serves both as a substrate for a touch panel, and as that for a front light. In the same manner as the first embodiment, therefore, the influence of reflected light in optical interfaces can be reduced and visibility can be improved as compared with the conventional art example.

Fourth Embodiment

Figure 8:
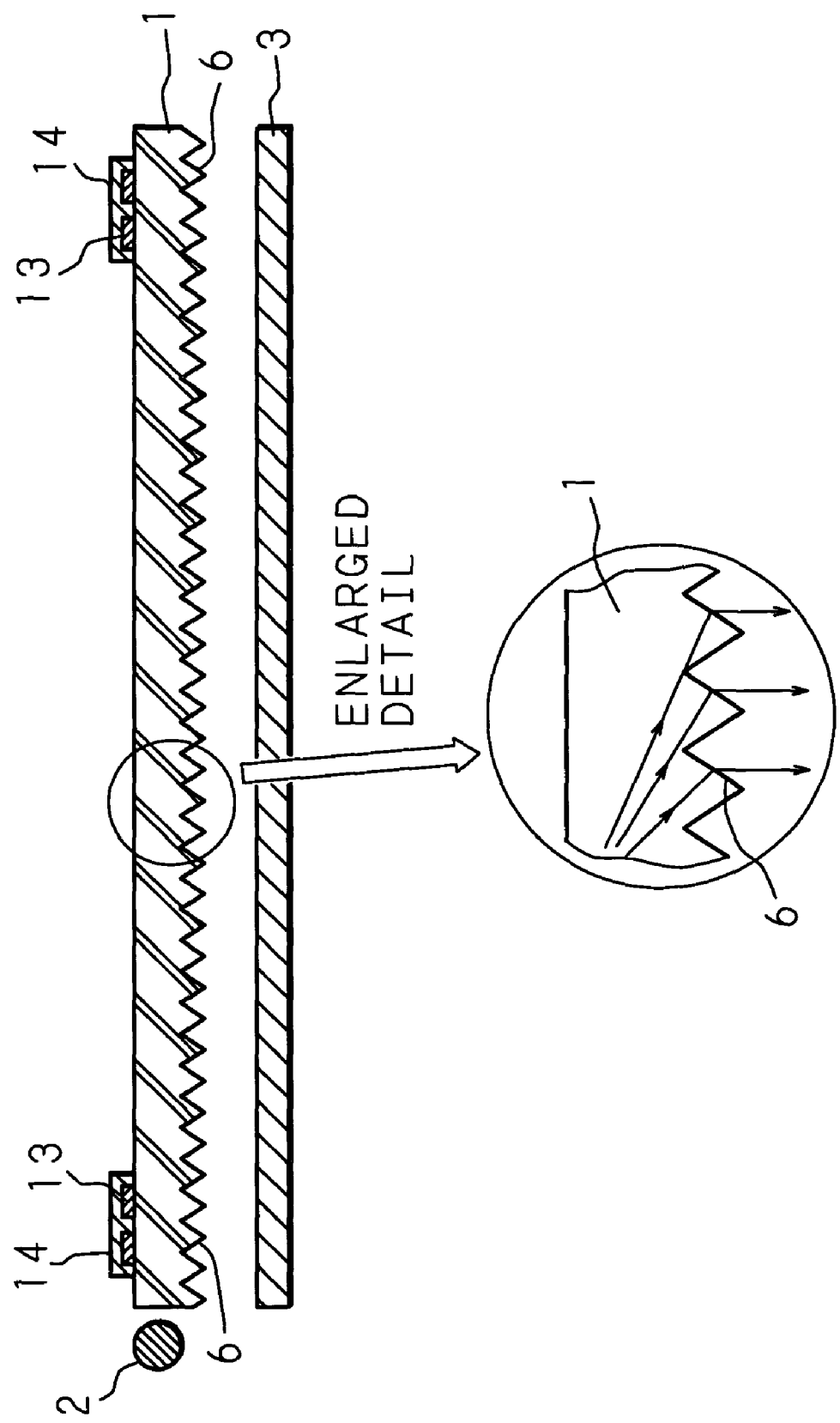
FIG. 8 is a section view showing the configuration of a touch panel device of a fourth embodiment.

FIG. 8 is a section view showing the configuration of a touch panel device using an ultrasonic wave of the fourth embodiment of the invention. In FIG. 8, the components identical with those of FIG. 3 are denoted by the same reference numerals. In the fourth embodiment, prisms 6 are formed by a fine pitch of about 0.1 mm in the back face (the face which is opposite to the face where the touched position is to be detected, or that which is opposed to the liquid crystal display 3) of the substrate 1 made of glass. The prisms 6 can be formed by cutting the back face of the substrate 1.

In the fourth embodiment, since the prisms 6 are disposed, total reflection conditions of the light propagated through the substrate 1 serving as a light guide are dissatisfied, thereby causing the light to be emitted toward the liquid crystal display 3. Specifically, as indicated by the thin solid arrow in the enlarged detail in FIG. 8, the light which is emitted from the light source 2 and propagated through the substrate 1 is emitted via the prisms 6 toward the liquid crystal display 3.

In this example, the prisms 6 are formed directly in the back face of the substrate 1. Alternatively, a sheet in which many prisms are formed may cover the back face of the substrate 1. In the alternative also, the same effects can be attained.

In the fourth embodiment also, the substrate serves both as a substrate for a touch panel, and as that for a front light. In the same manner as the first embodiment, therefore, the influence of reflected light in optical interfaces can be reduced and visibility can be improved as compared with the conventional art example.

Fifth Embodiment

Figure 9:
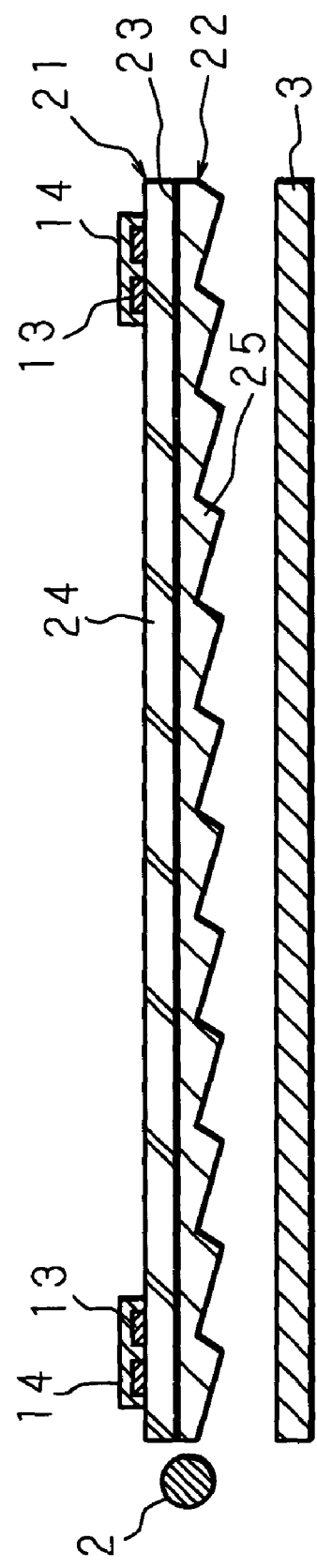
FIG. 9 is a section view showing the configuration of a touch panel device of a fifth embodiment.

FIG. 9 is a section view showing the configuration of a touch panel device using an ultrasonic wave a fifth embodiment of the invention. In the touch panel device of the fifth embodiment, a substrate for a touch panel, and that for a front light are bonded together by an adhesive agent.

A touch panel 21 is configured by disposing exciting elements 11 and receiving elements 12 on a first substrate 24 made of, for example, glass. In the same manner as the elements in the first to fourth embodiments shown in FIG. 4, each of the exciting elements 11 and the receiving elements 12 is configured by an inter digital transducer 13 and a piezoelectric thin film 14. A front light 22 has a second substrate 25 which is made of a resin, and which serves as a planar light guide. The back face of the first substrate 24 of the touch panel 21, and the front face of the second substrate 25 of the front light 22 are bonded together via an optically transparent adhesive agent layer 23.

In the same manner as the substrate 1 in the first embodiment, a step forming process is applied to the back face (the face which is opposite to the touch panel 21, or the face which is opposed to the liquid crystal display 3) of the second substrate 25. Light emitted from the light source 2 is incident to the first substrate 24 and the second substrate 25 to be propagated therethrough, and is then emitted to the outside on the back face side (on the side of the lower face in FIG. 9) to irradiate the liquid crystal display 3.

When the optical refractive indices of the first substrate 24, the second substrate 25, and the adhesive agent layer 23 are indicated respectively by n1, n2, and n3, the optical refractive indices n1, n2, and n3 satisfy the following conditions:

$$n1 \approx n3 \approx n2.$$

When the conditions of the optical refractive indices are satisfied, the number of the optical interfaces can be substantially made smaller than that in the conventional art example, so that the influence of useless reflected light can be reduced. Therefore, it is possible to realize high transmittance and excellent visibility similarly to the first to fourth embodiments.

The thus configured touch panel device may be produced by forming the exciting elements 11 and the receiving elements 12 on the first substrate 24, forming the step-like structure on the second substrate 25, and then bonding the substrates 24 and 25 together. Alternatively, the device may be produced by initially bonding the first substrate 24 and the second substrate 25 together, and then performing the formation of the exciting elements 11 and the receiving elements 12, and the formation of the step-like structure on the resulting bonded structure.

The embodiment is configured so that the first substrate 24 and the second substrate 25 are bonded together by an adhesive agent. Alternatively, the touch panel device may be configured by directly joining the first substrate 24 and the second substrate 25 together. In the embodiment, the step-like structure formed on the second substrate 25. In the same manner as the substrate 1 in the fourth embodiment, alternatively, a prism structure may be formed.

In the embodiments described above, a linear light source such as a fluorescent lamp is used as the light source 2. Alternatively, the light source 2 may be configured by combining LEDs (Light Emitting Diodes) with a linear light guide which converts light emitted from the LEDs into linear light and outputs the converted light.

In the embodiments described above, the position where an object is touched is detected by propagating a surface acoustic wave. An ultrasonic wave of another kind may be used.

Sixth Embodiment

In the above-described first through fifth embodiments, the invention is illustrated by taking as an example a touch panel device using an ultrasonic wave-type touch panel in which an ultrasonic wave is propagated through an optically transparent substrate and a change in the propagation state of the ultrasonic wave due to a touch of an object with the substrate is sensed to detect a position where the object is touched. However, the invention can also be similarly applied to a touch panel device using a resistance film-type touch panel in which a change in the resistance of a resistance film due to a touch of an object with the resistance film is sensed to detect a position where the object is touched.

Figure 10:
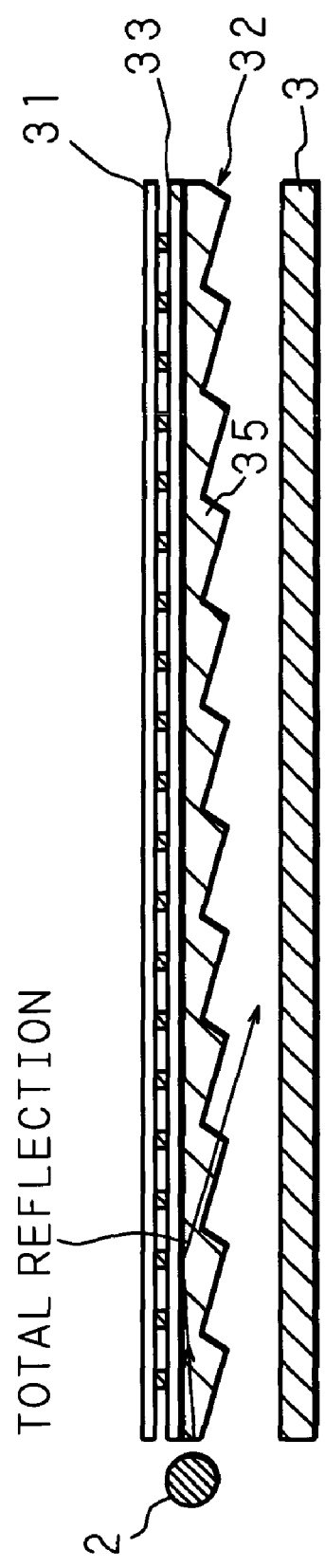
FIG. 10 is a section view showing the configuration of a touch panel device of a sixth embodiment.

The following description will explain an example of a touch panel device using a resistance film-type touch panel. FIG. 10 is a section view showing the configuration of a touch panel device using a resistance film according to the sixth embodiment of the invention.

In FIG. 10, 31 is a resistance film-type touch panel. A front light 32 has a planer light guide plate 35 made of a resin. The back face of the touch panel 31 and the front face of the light guide plate 35 of the front light 32 are bonded together through an optically transparent adhesive layer 33. In the same manner as for the substrate 1 of the first embodiment, a step-like structure is formed on the back face of the light guide plate 35 (the face opposite to the touch panel 31, namely the face facing the liquid crystal display 3), so that the light emitted from the light source 2 is incident on the light guide plate 35 to propagate inside the light guide plate 35 and is then emitted to the outside from the back face side (the lower face side in FIG. 10) to irradiate the liquid crystal display 3.

When the optical refractive indices of the substrate of the touch panel 31, the light guide plate 35, and the adhesive agent layer 33 are indicated by n1, n2, and n3, respectively, the optical refractive indices n1 n2, and n3 satisfy the following conditions:

$$n1 \approx n3 \approx n2$$

When such conditions of optical refractive indices are satisfied, the light propagated in the light guide plate 35 is totally reflected at the interface between the light guide plate 35 and the adhesive agent layer 33, and does not propagate into the touch panel 31.

As described above in detail, in the touch panel device of the invention, a single substrate is used both as a substrate for a touch panel and as that for a front light, and hence the number of substrates is reduced. Therefore, the number of optical interfaces is reduced as compared with the conventional art example, so that lowering of the brightness caused by reflected light can be suppressed and excellent visibility can be realized.

In the touch panel device of the invention, light which is incident to the substrate from the light source is guided to the outside (a reflective-type liquid crystal display) from the face that is opposite to the face where the touched position is to be detected. Therefore, the light can surely irradiate the reflective-type liquid crystal display.

In the touch panel device of the invention, a portion of an optical refractive index which is larger than that of a substrate is disposed in the back face of the substrate, a plurality of grooves are disposed in the back face of a substrate, or a plurality of prisms are disposed on the back face of a substrate. Therefore, light can be easily guided from the back face of the substrate to the outside, and the light can surely irradiate a reflective-type liquid crystal display. Since the formation direction of the grooves which are disposed in the back face of the substrate is set to have an angle of 35° to 55° with respect to the normal direction of the back face of the substrate, light can irradiate efficiently and substantially perpendicularly a reflective-type liquid crystal display.

In the touch panel device of the invention, since a substrate for a touch panel and that for a front light are bonded and integrated with each other by an adhesive agent, reflected light in optical interfaces can be reduced as compared with the conventional art example. Therefore, lowering of the brightness caused by reflected light is reduced and visibility can be improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A touch panel device comprising:
   a lighting device including a light source, a light guiding part on which light is incident from said light source, and a light guiding and emitting part for guiding light propagated through said light guiding part so as to emit the light as planar light to an outside,
   wherein the light to be guided to the outside from said light guiding and emitting part is emitted from a side opposite to a side on which the touched position is to be detected,
   wherein said light guiding part and light guiding and emitting part constitute a single optically transparent substrate,
   wherein said light guiding part propagates an ultrasonic wave through the optically transparent substrate and senses a change in a propagation state of the ultrasonic wave due to a touch of an object with said substrate so as to detect a position where the object is touched.

2. The touch panel device according to claim 1, wherein said light guiding and emitting part is a step-like structure formed on said light guiding part.

3. The touch panel device according to claim 2, wherein a formation direction of the step-like structure forms an angle of not more than 32.5° with respect to a normal direction of a face of said light guiding part.

4. The touch panel device according to claim 1, wherein an optical refractive index of said light guiding and emitting part is not less than an optical refractive index of said light guiding part.

5. The touch panel device according to claim 1, wherein said light guiding and emitting part is a plurality of protrusions formed on said light guiding part.

6. The touch panel device according to claim 5, wherein an optical refractive index of said protrusions is not less than an optical refractive index of said light guiding part.

7. The touch panel device according to claim 1, wherein said light guiding and emitting part is a plurality of grooves formed in said light guiding part.

8. The touch panel device according to claim 7, wherein a formation direction of said grooves forms an angle of 35° to 55° with respect to a normal direction of a face of said light guiding part.

9. The touch panel device according to claim 1, wherein said light guiding and emitting part is a plurality of prisms formed on said light guiding part.

10. A touch panel device in which an ultrasonic wave is propagated through a single optically transparent substrate and a change in a propagation state of the ultrasonic wave due to a touch of an object with said substrate is sensed to detect a position where the object is touched, comprising:
   a light source for emitting light which is to be incident on said substrate;
   said substrate guides the light incident on the substrate from said light source so as to emit the light to an outside, wherein said substrate
   is configured so that the light incident on said substrate from said light source is guided and emitted to the outside from a face of said substrate opposite to a face where the touched position is to be detected.

11. A touch panel device comprising:
   a touch panel for detecting a touched position; and
   a lighting device including a light source, a light guiding part on which light is incident from said light source, and a light guiding and emitting part for guiding light propagated through said light guiding part so as to emit the light as planer light, to the outside of the lighting device,
   wherein the light to be guided to the outside from said light guiding and emitting part is emitted from a side opposite to a side on which the touched position is to be detected, wherein
   said light guiding and emitting part is a step-like structure formed on a surface of said light guiding part opposite to the side on which the touched position is to be detected.

12. The touch panel device according to claim 11, wherein said touch panel senses a change in resistance of a resistance film due to a touch of an object with said resistance film so as to detect a position where the object is touched.

13. The touch panel device according to claim 11, further comprising an adhesive agent layer for bonding said substrate of said touch panel and said light guiding part of said lighting device together.

14. The touch panel device according to claim 13, wherein, when optical refractive indices of said substrate, said light guiding part, and said adhesive agent layer are indicated by n1, n2, and n3, respectively, the optical refractive indices n1, n2, and n3 satisfy the following conditions:

$$n1 \approx n3 \approx n2.$$

15. The touch panel device according to claim 11, further comprising an adhesive agent layer for bonding said touch panel and said light guiding part together.

16. The touch panel device according to claim 15, wherein, when optical refractive indices of said touch panel, said light guiding part, and said adhesive agent layer are indicated by n1, n2, and n3, respectively, the optical refractive indices n1, n2, and n3 satisfy the following conditions:

$$n1 \approx n3 \approx n2.$$

* * * * *